United States Patent [19]

Whitson

[11] 4,161,925

[45] Jul. 24, 1979

[54] ELECTRONIC CONTROLS FOR AUTOMATICALLY OPERATING A CATTLE DIPPING VAT

[75] Inventor: Donald W. Whitson, Scott City, Kans.

[73] Assignee: All Phase Electronics, Inc., Scott City, Kans.

[21] Appl. No.: 859,233

[22] Filed: Dec. 9, 1977

[51] Int. Cl.² ..................... A01K 13/00; A61D 11/00
[52] U.S. Cl. ................................................. 119/158
[58] Field of Search ......................................... 119/158

[56] References Cited

U.S. PATENT DOCUMENTS

| | | | |
|---|---|---|---|
| 2,848,977 | 8/1958 | Prestrud et al. | 119/158 |
| 3,543,725 | 11/1970 | Kirkpatrick et al. | 119/158 |
| 3,598,088 | 8/1971 | Bowman et al. | 119/158 |

*Primary Examiner*—Hugh R. Chamblee
*Attorney, Agent, or Firm*—Edwin H. Crabtree

[57] ABSTRACT

An electrical control device for automatically operating a cattle dipping vat. The device attached to existing cattle dipping vat equipment in eliminating the manual operation of receiving cattle in a cage, lowering the cage into the dipping vat, raising the cage from the dipping vat, and discharging the cattle from the cage.

7 Claims, 6 Drawing Figures

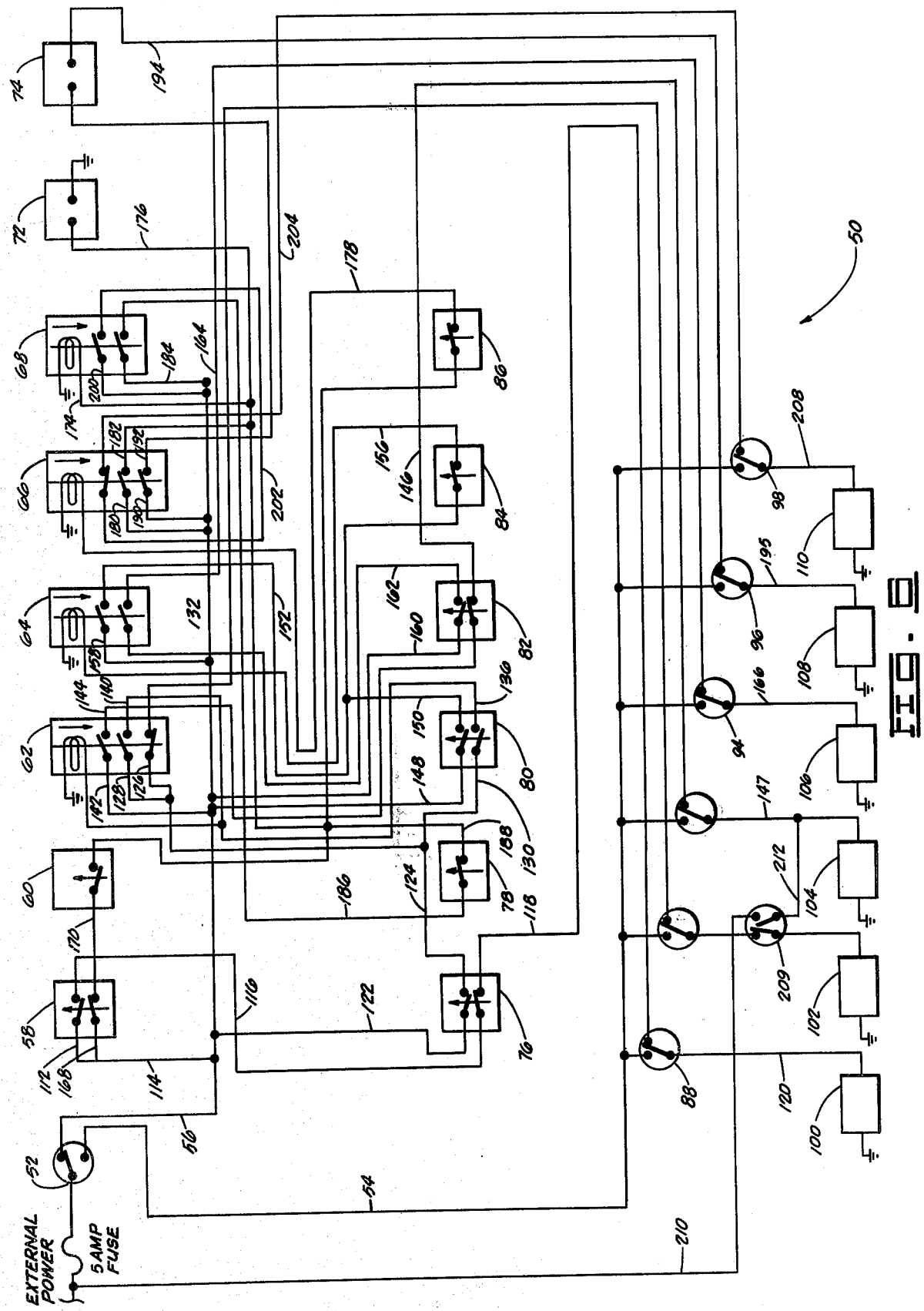

1

ELECTRONIC CONTROLS FOR AUTOMATICALLY OPERATING A CATTLE DIPPING VAT

BACKGROUND OF THE INVENTION

This invention relates generally to dipping vat equipment and more particularly, but not by way of limitation, to an electronic control device for automatically operating a cattle dipping vat.

Heretofore there have been various types and designs of dipping vats for cattle and other domestic animals. In particular U.S. Pat. No. 3,598,088 to Bowman et al and U.S. Pat. No. 2,848,977 to Prestrud et al disclose dipping vats utilizing a cage to contain an animal therein and for lowering the animal into a dipping solution. None of the prior art dipping vat devices disclose means for automatically controlling the equipment used in a cattle dipping operation.

SUMMARY OF THE INVENTION

The invention eliminates the manual operation of a hydraulically controlled animal dipping vat thereby reducing the labor cost involved in operating the dipping vat.

The device is so constructed to provide a uniform and continuous sequence in the dipping operation. The uniform and continuous nature of the automatic operation provides a reduction in animal processing time, a reduction in the stress to the individual animal, and insures complete and satisfactory dipping of the animal.

The device automatically sequences the operation of an animal dipping vat which heretofore has been manually operated using hydraulic controls.

The invention provides a manual override system to prevent the drowning of the animal in the dipping vat should there be a malfunction in the electrical controls of the device.

The electrical control device includes a pair of electric eye light sensors and a series of interlocking switches and relays which are connected electrically to hydraulic solinoid valves attached to the existing hydraulic controls of the dipping vat. When an animal enters the cage of the dipping vat, the light beam of one of the electric eye light sensors is broken which causes the back door to be closed. When the back door is closed, the cage is lowered into the dipping tank. When the cage hits the bottom of the tank, the travel of the cage is reversed and it is started upwardly. When the cage reaches the top of its travel, the front door opens allowing the animal to leave the cage. As the animal exits the cage, it breaks the light beam of the second electric eye light sensor thereby closing the front door. When the front door closes, the back door then opens and the cage is then ready for receiving another animal, and the cycle of dipping an animal is repeated.

The advantages and objects of the invention will become evident from the following detailed description when read in conjunction with the accompanying drawings which illustrate the preferred embodiments of the invention.

BRIEF DESCRIPTION OF THE DRAWINGS

FIG. 6 is an electrical diagram for the automatic control of the cattle dipping vat operation.

DETAILED DESCRIPTION OF THE DRAWINGS

Figure 1:
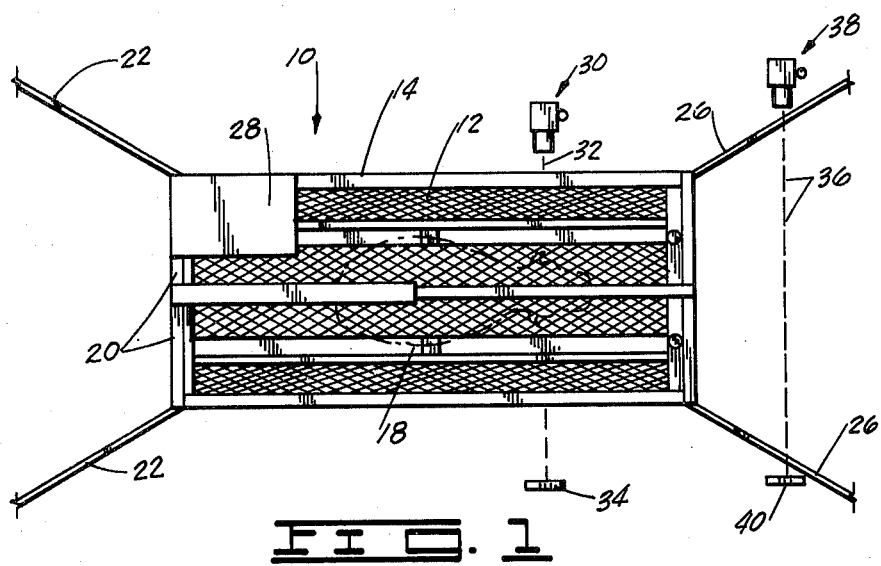
FIG. 1 is a top view of a cattle dipping vat.

In FIG. 1 a top view of a typical cattle dipping vat 10 is illustrated. The vat 10 includes a cage 12 mounted in a cage housing 14 and disposed above a tank 16 shown in FIG. 2. The tank 16 holds a dipping fluid for medically treating the animal. The cage 12 is lowered and raised into the tank 16 by hydraulic cylinders. The hydraulic cylinders are not shown in the drawings, but are standard in the industry for obtaining linear motion utilizing hydraulic power. In this view, an animal 18 is shown in dotted lines inside the cage 12. The cage housing 14 includes back doors 20 with guide rails 22 adjacent thereto. The cage housing 14 further includes front doors 24 with guide rails 26 adjacent thereto.

Figure 3:
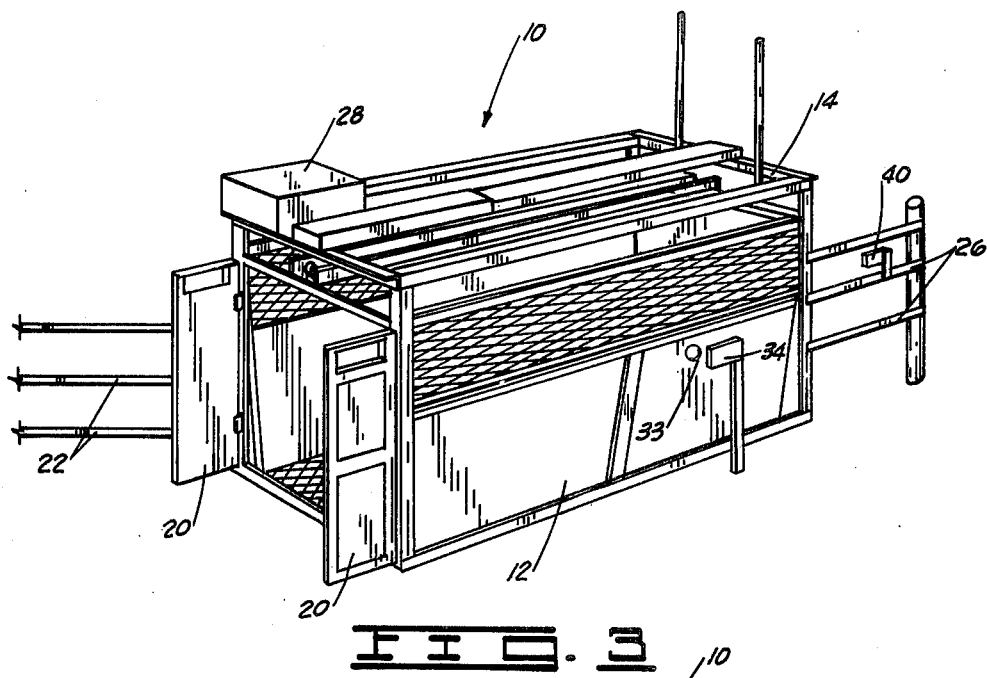
FIG. 3 is a perspective view of the cattle dipping vat with back door open for receiving the animal therein.
Figure 5:
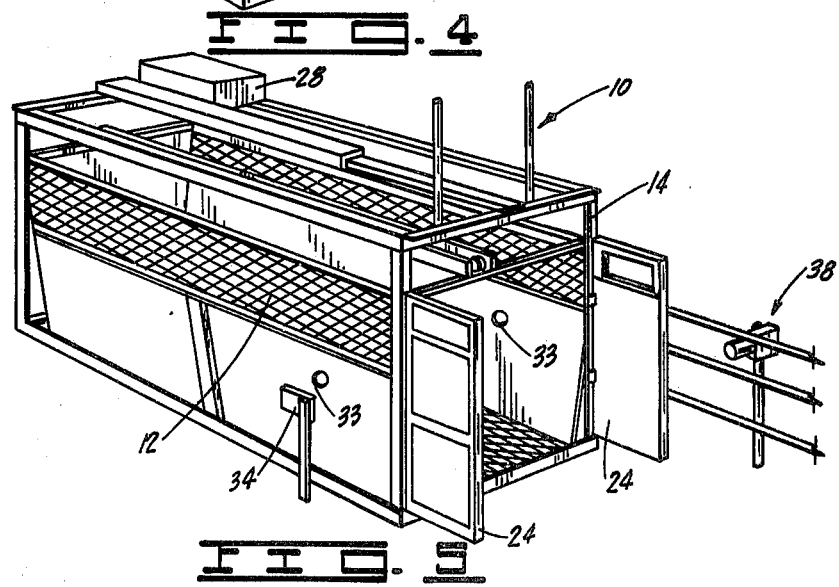
FIG. 5 is a perspective view of the dipping vat raised and the front door opened.

The electrical control device includes a plurality of electrical switches, relays, and hydraulic solinoids attached to the hydraulic cylinders and discussed under FIG. 6. A hydraulic tank 28 is mounted on top of the cage housing 14. The device further includes a first light sensitive switch 30 which passes a beam of light 32, shown in dotted lines, through apertures 33 in the sides of the cage 12 where the light contacts a reflector 34 and the light sensitive switch 30 sensing the reflected light beam. The aperatures 33 are seen in FIGS. 3 and 5. The light sensitive switch 30 is used for detecting when the animal 18 is received in the cage 12. When the animal 18 exits out the front doors 24, it passes through a second beam of light 36, shown in dotted lines. The beam of light 36 is from a second light sensitive switch 38 which passes the beam of light 36 to a reflector 40 and the light sensitive switch 38 sensing the reflected light beam.

Figure 2:
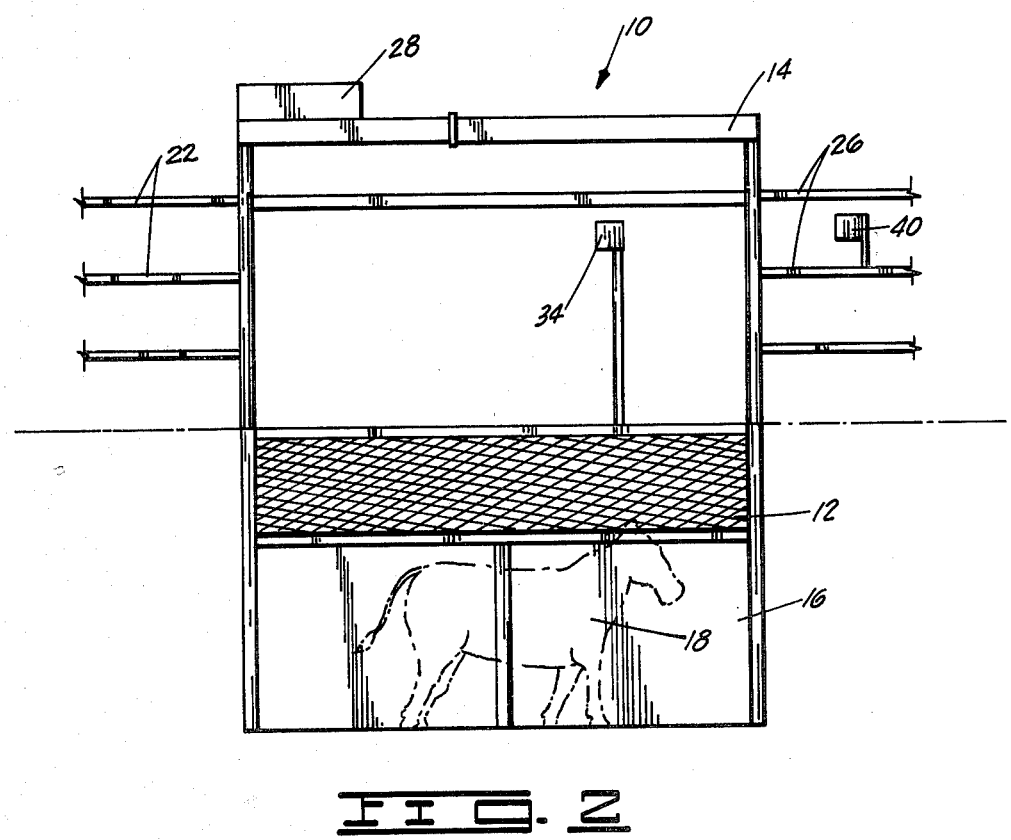
FIG. 2 is a side view of a cattle dipping vat with the cage lowered into the vat.

When the animal 18 has been received in the cage 12, the back doors 20 are hydraulically closed and the cage 12 is lowered into the tank 16. When the cage 12 reaches the bottom of its travel, as shown in FIG. 2, the hydraulic controls are electrically switched. The travel of the cage 12 is reversed, and the cage 12 travels upwardly until it reaches the top of the housing 14. When the cage 12 reaches the top of its travel, the front cage doors 24 are opened.

In FIG. 3, a perspective view of the dipping vat 10 is illustrated with the back doors 20 open ready for receiving the animal 18 therein. In this view, the aperature 33 can be seen in the side of the cage 12 for transmitting the beam of light 32 from the light sensor 30 to the reflector 34 and back again. When the animal 18 is received in the cage 12, the closing mechanism of the back cage doors 20 is actuated by the subject invention.

Figure 4:
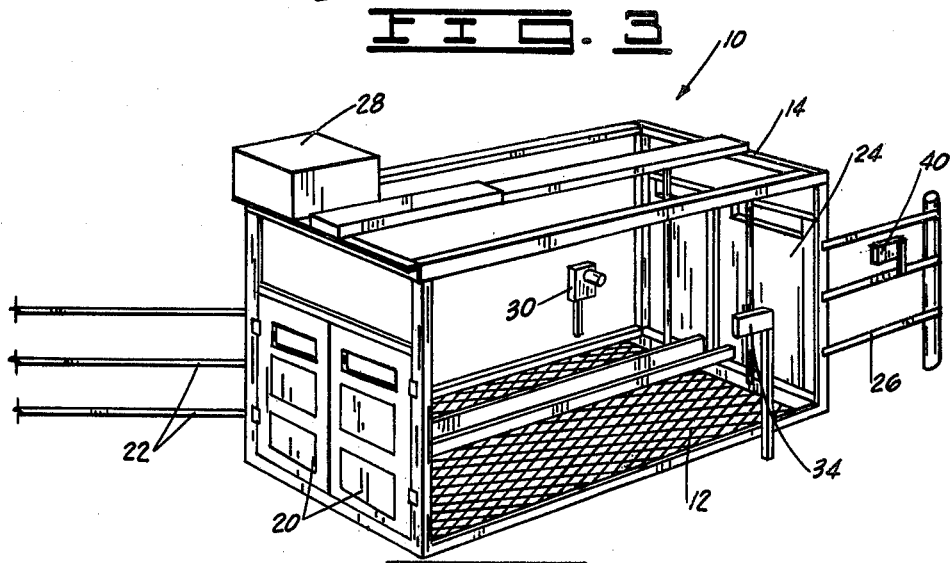
FIG. 4 is a perspective view with the case of the dipping vat lowered.

In FIG. 4, a perspective view of the vat 10 is seen with the cage 12 lowered into the tank 16 for immersing the animal in the dipping vat solution.

In FIG. 5, the cage 12 has been raised from the tank 16. When the cage 12 reaches the top of its travel, the front doors 24 open, and the animal 18 exits out the front of the cage. When the animal has broken the second beam of light 36, the front doors 24 are closed. As soon as the front doors 24 are closed, the rear doors 20 are opened ready for receiving another animal, and the cycle of dipping the animal in the tank 16 is repeated.

In FIG. 6, the electrical control device is designated by general reference numeral 50. The device 50 includes broadly the following components wired together for providing the sequential steps for automatically receiving an animal in the cage 12, lowering the cage 12 into the tank 16, raising the cage 12 from the tank 16, and discharging the animal therefrom. It should be appreciated that while the following circuitry electrically operates the subject invention, different types of circuitry could be used equally well.

The components are a manual electrical switch 52 connected to an external power source so as to power a manual power line 54 or an automatic power line 56. The automatic power line 56 is connected to the light sensitive switches, to the relay switches, and the mechanically activated electrical switches that provide the sequential switching for opening and closing the back and front cage doors 20 and 24 and raising and lowering the cage 12. These electrical components include a first light sensitive switch 58, a second light sensitive switch 60, a first relay 62, a second relay 64, a third relay 66, a fourth relay 68, an electrical counter 72, an electrical time delay 74, a first mechanically activated electrical switch 76, a second switch 78, a third switch 80, a fourth switch 82, a fifth switch 84, and a sixth switch 86.

The manual power line 54 is connected to manual override switches that allow manually operating the dipping vat through each of the sequential steps. These electrical components include a first manual override switch 88, a second switch 90, a third switch 92, a fourth switch 94, a fifth switch 96, and a sixth switch 98.

The sequencing devices and the manual override switches are connected to hydraulic solenoids controlling the hydraulic cylinders of the vat 10 and are used for turning each hydraulic cylinder on and off. The solenoids include a first hydraulic solenoid 100, a second solenoid 102, a third solenoid 104, a fourth solenoid 106, a fifth solenoid 108, and a sixth solenoid 110.

The first light sensitive switch 58 is positioned to be switched when an animal has entered the cage 12 and includes two ganged poles, one normally open and designated by NO and one pole normally closed and designated by NC. The switches described hereinafter having normally opened and closed poles are designated using the appreciation NO and NC. The NO poles connected via conductor 116 to the NC poles of switch 76 are positioned so as to be switched when the back cage doors 20 are closed. The corresponding NC poles of switch 76 are connected via conductor 118 to the switch 88 NC poles. The poles of the switch 88 are connected via conductor 120 to the first solenoid 110. This series of connections turn on the existing hydraulic cylinder, close the back cage doors 20 when the animal enters the cage, and shut the cylinder off when the back cage doors 20 are closed.

The NO poles of switch 76 are positioned so as to be switched when the back cage doors 20 are closed and are connected to lead 56 via conductor 122 and via conductor 124 and conductor 126 to the NC poles of relay 62 and conductor 128 to one of the NO poles of relay 62 and conductor 130 to one of the NO poles of switch 80. The NC poles of relay 62 are connected via conductor 132 to the NC poles of switch 90. The poles of switch 90 are connected via conductor 134 to solenoid 102. The series of connections turning on the existing hydraulic cylinder and lowering cage 12 when the back cage doors 20 are closed.

The NO poles corresponding to the switchable poles connected to conductor 130 of the third switch 80 are positioned so as to be switched when the cage 12 reaches the bottom of its travel and is connected via conductors 136 and 138 to the first relay 62 actuating contact so as to switch the first relay 62 when the cage 12 has reached the bottom.

The NO poles connected to conductor 128 of the first delay 62 are connected via conductor 140 and the conductor 138 to the first relay 62 actuating contact so as to provide power as long as the back doors 20 are closed. When the back doors 20 are open the power provided through the switch 76 is terminated, deactivating the sequencing elements.

The remaining NO poles of the relay 62 are connected via conductor 142 to the automatic power line 56. The corresponding pole is connected by a conductor 144 to the NC poles of switch 82. The corresponding NC pole of the switch 82 is positioned so as to be switched when the cage 12 reaches the top of its travel and is connected via conductor 146 to the NC poles of switch 92. The poles of the switch 92 are connected via conductor 147 to the third solenoid 104. This series of connections turn on the existing hydraulic cylinder that raises the cage 12 after the cage 12 has reached the bottom of its travel and shuts off the hydraulic cylinder when the cage 12 has reached the top of its travel.

The remaining NO poles of switch 80 are connected via conductor 148 to the line 56. The corresponding pole is connected via conductor 150 and conductor 152 to the NC poles of the switch 84 positioned so as to be switched when the front doors 24 are open.

The corresponding pole of the switch 84 is connected by a conductor 156 to the relay 64 actuating contact so as to switch relay 64 when the cage 12 has reached the bottom of its travel and the front cage doors 24 are closed. One of the NO poles of the relay 64 are connected by a conductor 158 to the power line 56. The corresponding pole is connected via conductor 152 to the NC poles of the switch 84. The poles of switch 84 are connected via conductor 156 to relay 64 actuating contact so as to maintain relay 64 in the switched position so long as the front cage doors 24 are closed. The remaining NO poles of the switch 82 are connected via conductor 160 to the line 56. The corresponding NO pole of the switch 82 is connected via conductor 162 to the remaining NO poles of relay 64. The corresponding terminal pole of relay 64 is connected via conductor 164 to the NC poles of the switch 94. The poles of the switch 94 are connected via conductor 166 to the solenoid 106. This series of connections prevents the cage doors 20 and 24 from being opened when the cage 12 is lowered and raised and switches on the existing hydraulic cylinder that opens the front cage doors 24 when the cage 12 reaches the top of the travel and switches off the cylinder when the front cage doors 24 are opened.

One of the NC poles of the switch 58 is connected via conductor 168 and conductor 114 to the line 56. The corresponding pole of the switch 58 is connected via conductor 170 to the NO poles of switch 60 and is positioned so as to be switched when an animal is exiting the cage 12. The corresponding pole of the switch 60 is connected via conductor 172 to the NC poles of switch 86 and via conductor 172 and conductor 174 to the relay 68 actuating contact and via conductor 172 and conductor 176 to counter 72. The poles of switch 86 are connected via conductor 178 to relay 66 actuating contact. These connections provide for the switching of relay 68, the counting of the animals being processed, and the switching of relay 66. One of the NO poles of the relay 66 is connected via conductor 180 to the line 76. The corresponding pole is connected via conductor 182 to the poles of the switch 86 so as to provide actuating power for relay 66 so long as the front cage doors 24 are open.

One of the NO poles of the relay 68 is connected via conductor 184 to line 76. The corresponding pole is connected via a conductor 186 to the poles of switch 78. The corresponding pole of switch 78 is connected via conductor 188 and conductor 174 to the relay 68 so as to provide actuating power for the relay 68 so long as the back cage doors 20 are closed. The remaining NO poles of the relay 66 are connected by a conductor 190 to the line 56. The corresponding pole of the third relay 66 is connected via conductor 192 to the input pole of the time delay 74. The output pole of the time delay 74 is connected via conductor 194 to the NC poles of switch 96. The poles of the switch 96 are connected via conductor 195 to the solenoid 108. This series of connections turns on the existing hydraulic cylinder that closes the front cage doors 24 when the cage 12 is empty. The time delay provides sufficient time to allow the animal to clear the cage doors 24, and then the hydraulic cylinder that closes the front cage doors 24 is turned off.

The remaining NC poles of the relay 68 are connected via conductor 200 to the power line 56. The corresponding pole of the relay 68 is connected via conductor 202 to the NC pole of the relay 66. The NC pole of the relay 66 is connected via conductor 204 to NC pole of switch 98. The poles of switch 98 are connected via conductor 208 to solenoid 110. This series of connections turns on the existing hydraulic cylinder that opens the rear cage doors 20 when the cage 12 is empty and the front cage doors 24 are closed and shuts off the existing hydraulic cylinder that opens the rear cage doors 20 when the rear cage doors 20 are open. The cycle of lowering and raising the animal in the cage 12 is then repeated.

An added safety feature of the device 50 is an emergency switch 209 having NC poles wired to conductor 134. The NO poles of the switch 209 are wired to the external power source by conductor 210 and to the conductor 147 via conductor 212. When, for example, the animal catches his foot in the cage 12 as it is being lowered, the switch 209 may be closed manually and the power to solenoid 102 is opened and the power to solenoid 104 is closed and the cage 12 is immediately raised to correct the problem.

Changes may be made in the construction and arrangement of the parts or elements of the embodiments as disclosed herein without departing from the spirit or scope of the invention as defined in the following claims.

I claim:

1. An electrical control device for automatically operating a cattle dipping vat, the vat having a tank containing sufficient dipping fluid to allow an animal to be immersed therein, a cage for receiving the animal therein and suspending the animal above the tank, the vat having a cage frame with a front door and a back door, the vat having hydraulic cylinders for lowering and raising the cage in the tank and opening and closing the front and back door, the device comprising:

a first sensing means for determining the presence of an animal in the cage;
a first hydraulic switch means connected to said first sensing means and the hydraulic cylinder, said first hydraulic switch means turned on when the animal is in the cage and closing the back door;
a second sensing means for determining when the back door is closed connected to said first hydraulic switch means and turning off said first hydraulic switch means;
a second hydraulic switch means connected to said second sensing means and the hydraulic cylinder, said second hydraulic switch means turned on for lowering the cage into the tank after the back door has been closed;
a third sensing means for determining when the cage is at the bottom of its travel in the tank connected to said second hydraulic switch means and turning off said second hydraulic switch means;
a third hydraulic switch means connected to said third sensing means and the hydraulic cylinder, said third hydraulic switch means turned on for raising the cage from the tank when the cage has reached the bottom of its travel;
a fourth sensing means for determining when the cage is at the top of its travel when raised from the tank connected to said third hydraulic switch and turning off said third hydraulic switch means;
a fourth hydraulic switch means connected to said fourth sensing means and the hydraulic cylinder, said fourth hydraulic switch means turned on for opening the front cage door when the cage is at the top of its travel;
a fifth sensing means for determining when the front cage door is open connected to said fourth hydraulic means the turning off said fourth hydraulic switch means;
a sixth sensing means connected to said first sensing means to determine when the animal has exited the cage and the cage is empty;
a fifth hydraulic switch means connected to said sixth sensing means and to the hydraulic cylinder, said fifth hydraulic switch means turned on for closing the front cage door when the animal has exited the cage;
a seventh sensing means for determining whent the front cage door is closed, connected to said fifth hydraulic switch means and turning off said fifth hydraulic switch means;
a sixth hydraulic switch means connected to said seventh sensing means and to the hydraulic cylinder activator, said sixth hydraulic switch means turned on for opening the back cage door when the front cage door is closed; and
an eighth sensing means for determining when the back cage door is open and connected to said sixth hydraulic switch means and turning off said sixth hydraulic switch means.

2. The device as described in claim 1 wherein said first, second, third, fourth, fifth, and sixth hydraulic switch means are hydraulic solenoids attached to the hydraulic cylinders of the dipping vat.

3. The device as described in claim 2 further including manual override switches connected to said hydraulic solenoids for providing a means of manually operating the dipping vat should the electrical control device malfunction or single step operation be desired.

4. The device as described in claim 1 wherein said first sensing means and said sixth sensing means are light sensitive switches.

5. The device as described in claim 1 wherein said second, third, fourth, fifth, seventh and eighth sensing means are mechanically activated electrical switches.

6. The device as described in claim 1 further including a time delay switch connected to said sixth sensing means and said fifth hydraulic switch means for providing additional time for the exiting of the animal to clear the front door of the cage.

7. The device as described in claim 1 further including an electric counter connected to said sixth sensing means for counting the number of animals exited from the cage.

* * * * *